United States Patent [19]

Leonard

[11] Patent Number: 4,908,047
[45] Date of Patent: Mar. 13, 1990

[54] SOOT REMOVAL FROM EXHAUST GAS

[75] Inventor: Robert E. Leonard, Oklahoma City, Okla.

[73] Assignee: Kerr-McGee Coal Corporation, Oklahoma City, Okla.

[21] Appl. No.: 107,721

[22] Filed: Oct. 9, 1987

[51] Int. Cl.$^4$ .................................. B03C 1/00
[52] U.S. Cl. .......................... 55/10; 55/11; 55/122; 55/135; 55/146; 55/DIG. 30; 60/275; 60/310
[58] Field of Search ............... 55/8, 10, 11, 122, 135, 55/138, 146, 151, DIG. 30; 60/275, 310; 174/30 R, 31 R

[56] References Cited

U.S. PATENT DOCUMENTS

| | | | |
|---|---|---|---|
| 1,067,974 | 7/1913 | Cottrell | 55/151 |
| 1,329,818 | 2/1920 | Wolcott | 55/122 |
| 1,787,955 | 1/1931 | Rosencrans | 55/151 |
| 1,837,489 | 12/1931 | Rowland | 55/146 |
| 3,714,762 | 2/1973 | Fillies et al. | 55/146 |
| 3,768,258 | 10/1973 | Smith et al. | 55/146 |
| 4,117,255 | 9/1978 | Kawaike et al. | 55/146 |

FOREIGN PATENT DOCUMENTS 564430 11/1932 Fed. Rep. of Germany ........ 55/135

OTHER PUBLICATIONS

Publication entitled, "Diesel Engines in Underground Mines", sponsored by Bureau of Mines, United States Department of Interior, Apr., 1983.
Publication entitled, "Assessment of Diesel Particulate Control Filters, Scrubber and Precipitators", U.S. Department of Commerce, Oct. 1979.
Manual entitled, "A Manual of Electrostatic Precipitator Technology, Part II: Application Areas", U.S. Department of Commerce, Aug. 1970.

Primary Examiner—Bernard Nozick
Attorney, Agent, or Firm—Herbert M. Hanegan; John P. Ward

[57] ABSTRACT

A method and apparatus for removing soot from an exhaust gas stream wherein the exhaust gas stream is contacted with water to produce a substantially water saturated exhaust gas stream, particles and droplets in the water saturated gas stream then are electrically charged to produce a gas stream containing electrically charged particles and droplets, and an electric field is established for electrostatically attracting and de-entraining soot and soot containing water droplets from the gas stream containing electrically charged particles and droplets to produce a substantially soot free exhaust gas stream. The present invention includes a precipitator wherein the insulators are positioned in low dew point relatively clean locations and, in one embodiment, includes the use of the exhaust gas stream to maintain the temperature level of the insulators above dew point. In one other embodiment, the condensate produced as a result of electrostatically attracting and de-entraining soot and soot containing water droplets from the exhaust gas stream containing electrically charged particles and droplets is recirculated and used as part of the water for contacting the exhaust gas stream.

17 Claims, 6 Drawing Sheets

SOOT REMOVAL FROM EXHAUST GAS

BACKGROUND OF THE INVENTION

Field of the Invention

The present invention contemplates a method and apparatus for removing contaminates from an exhaust gas stream wherein the exhaust gas stream is contacted with water to produce a substantially water saturated gas stream, the particles and droplets in the water saturated gas stream are electrically charged by passing through an ionizing zone, and then passed through an electric field within a cooled collecting zone where both contaminate containing water droplets and particles from the gas stream are removed by electrostatic force to produce a substantially contaminate free gas stream.

DESCRIPTION OF THE PREFERRED EMBODIMENTS

In many applications, it is desirable to reduce the amount of contaminates in a gas stream. This particularly is desirable with respect to diesel engines which produce an exhaust gas stream containing soot and the problem is magnified when the diesel engine is associated with a mobile underground mine machine because of the already restricted environment in mines. Further, this problem again is magnified when the underground mine machine is mobile because of the restricted or limited available power sources, the limited amount of space and the limited availability of fluids such as water.

The present invention provides a system for removing soot from a diesel engine exhaust stream which particularly is adapted for use in conjunction with diesel engines operating in underground mine environments, including a mobile underground mine machine, although the present invention also is useful in other mobile diesel engine applications, such as in conjunction with buses, for example.

In the system of the present invention, the exhaust gas stream first is contacted with water to produce a substantially water saturated gas stream. The water saturated gas stream then is passed simultaneously through a cooling zone and an ionizing zone wherein particles and droplets in the water-saturated gas stream are electrically charged to produce a gas stream containing electrically charged particles and droplets. Said gas stream then is passed through a cooled collection zone wherein an electric field is maintained to electrostatically attract and de-entrain soot containing water droplets and particles to produce a substantially soot free exhaust gas stream. The walls of the cooled collecting zone are maintained below the dew point of the inlet exhaust gas stream so that both the water from the droplets electrostatically collected on the walls and water condensed from the gas stream are used to remove soot continuously from the walls.

Figure 1:
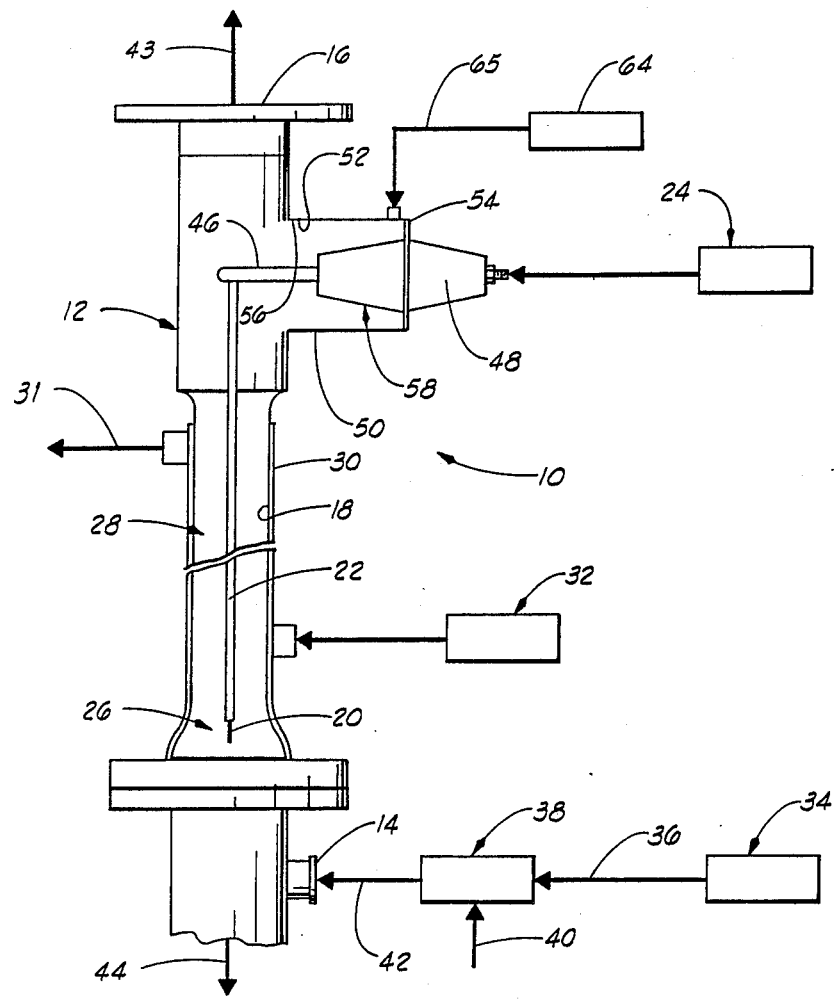
FIG. 1 is a sectional view of a precipitator constructed in accordance with the present invention and diagrammatically illustrating the system of the present invention.

The system of the present invention is diagrammatically illustrated in FIG. 1 and designated therein by the general reference numeral 10. The system 10 includes an electrostatic precipitator 12.

The electrostatic precipitator 12 has an inlet opening 14 and an outlet opening 16. A flow opening 18 is formed in the precipitator 12 and the flow opening 18 extends a distance therethrough. The inlet and outlet openings 14 and 16 each intersect the flow opening 18 and the flow opening 18 is in fluidic communication with the inlet and outlet openings 14 and 16.

An electrode 20 is disposed in the flow opening 18 generally near the inlet opening 14. A conductor 22 also is disposed in the flow opening 18 and the conductor 22 extends a distance generally between the inlet and outlet openings 14 and 16. The electrode 20, more particularly, is connected to one end of the conductor 22 and the conductor 22 cooperates to support the electrode 20 in the flow opening 18. The electrode 22 is connected to an electrical energy source 24, and the conductor 22 cooperates to connect the electrode 20 to the electrical energy source 24.

The electrode 20 is shaped and the electrical energy source 24 is adapted to deliver electrical energy to the electrode 20 so the electrode 20 is maintained at a potential just below where sparking occurs. The electrode 20 cooperates with the electrical energy source 24 to produce an ionizing zone 26 in the flow opening 18 generally near the inlet opening 14. The ionizing zone 36 is adapted to electrically charge particles and droplets in a gas stream passing therethrough.

The electrical energy source 24 also delivers electrical energy to the conductor 22. When the electrical energy source 24 is delivering electrical energy to the conductor 22, the conductor 22 acts as an electrode and the portion of the walls of the precipitator 12 generally surrounding the conductor 22 act as a second electrode. An electric field thus is established generally between the conductor 22 and the surrounding wall portions of the precipitator 12. This electric field cooperates to produce a cooled collection zone 28 in the flow opening 18 and extending a distance generally between the inlet opening 14 and the outlet opening 16. The cooled collection zone 28 is adapted to electrostatically attract and de-entrain soot and soot containing water droplets from the gas stream passing therethrough.

A hollow cooling jacket 30 is formed about a portion of the precipitator 12 and the cooling jacket 30 extends a distance generally between the inlet and outlet openings 14 and 16. The cooling jacket 30 is adapted to receive fluid from a cooling fluid source 32 and the cooling fluid is circulating through the hollow portion of the cooling jacket 30. The cooling water is passed from the cooling jacket 30 as indicated in FIG. 1 by the arrow 31.

The temperature level of the cooling fluid passing through the cooling jacket 30 is such that the portion of the wall of the precipitator 12 surrounding the conductor 22 is maintained at a temperature level below the dew point of the gas stream passing through the cooled collection zone 28. In other words, the cooling fluid maintains the portions of the wall of the precipitator 12 surrounding the electrode 20 at a temperature level sufficiently cool so that water vapor condenses on such walls during the operation of the system 10. The cooling fluid and the cooling jacket 30 cooperate with the portion of the wall of the precipitator 12 surrounding the electrode 22 and the electrode 22 to produce the cooled collection zone 28.

In addition, the cooling jacket 30 extends a distance beyond the cooled collection zone 28 so that portions of the cooling jacket 30 surround the walls extending about the ionizing zone 26. In this manner, the water saturated gas stream is cooled prior to or simultaneously with the water gas stream passing through the ionizing zone 26 to initiate the condensation process.

As diagrammatically illustrated in FIG. 1, an exhaust gas stream from a diesel engine 34 is passed through a conduit 36 and into a contact zone 38. Water is passed into the contact zone 38 through a conduit 40. In the contact zone 38, the exhaust gas stream is contacted with water and cooled to saturation temperature to produce a substantially water saturated gas stream. The water saturated gas stream is passed from the contact zone 38 through a conduit 42 and into the inlet opening 14 of the precipitator 12. The contact zone 38 may be constructed utilizing water sprays or may comprise a packed bed type of contactor, for example.

In operation, the exhaust gas stream is passed through the contact zone 38 where the exhaust gas stream is contacted with water and cooled to saturation temperature, thereby producing the water saturated gas stream. The water saturated gas stream is passed from the contact zone 38 and into the flow opening 18 in the precipitator 12.

More particularly, the water saturated gas stream is passed into the ionizing zone 26 formed in a portion of the flow opening 18. In the ionizing zone 26, a corona discharge produces ionized gas particles and electrons which become attached to the fluid droplets and particles imparting an electric charge. The gas stream now contains charged particles and droplets. The ionized gas stream passes through the flow opening 18 from the ionizing zone 26 and into the cooled collection zone 28. In the cooled collection zone 28, the gas stream containing electrically charged particles and droplets passes through an electric field extending generally between the conductor 22 and the surrounding portions of the wall of the precipitator 12. The electric field in the cooled collection zone 28 forces the charged particles and droplets to move to the portions of the wall of the precipitator 12 generally surrounding the conductor 22 where the charged particles droplets collect in the film of water which continuously is formed by condensation, thereby electrostatically attracting and de-entraining soot and soot containing water droplets from the gas stream. Thus, a substantial portion of the soot is removed from the gas stream in the cooled collection zone 28 to produce the substantially soot free exhaust stream. The substantially soot free exhaust gas stream is passed from the cooled collection zone 28, through the flow opening 16 and then the substantially soot free exhaust gas stream is passed from the precipitator 12 through the outlet opening 18, as indicated by the arrow 43 in FIG. 1. The condensate including the collected soot and soot containing water droplets flows by gravity along the walls of the precipitator 12 and is passed from the precipitator 12, as indicated in FIG. 1 by the arrow 44.

The end of the conductor 22, opposite the end connected to the electrode 20, is connected to one end of an electrically conductive support 46. The opposite end portion of the support 46 extends through an insulator 48 and the electrical energy supply 24 is connected to the support 46. The insulator 48 is connected to the precipitator 12 and is constructed of a material capable of electrically insulating the support 46 and the conductor 22 connected thereto from the precipitator 12.

The placement and the environment of the insulator 48 is crucial to the successful operation of the precipitator 12 because the exhaust gas stream contains water vapor, acidic gases such as $SO_2$, $CO_2$, $H_2SO_4$ and $NO_x$ together with conductive particles. If these contaminants contact the insulator 48 and form a film on the insulator 48, the insulative function of the insulator 48 would be destroyed. Thus, it is desirable to locate the insulator 48 in an atmosphere free of conductive particles and water. The temperature level of the insulator 48 must be maintained above the dew point of the gas surrounding the insulator 48 to prevent water from condensing on the insulator 48.

The precipitator 12 includes an insulator chamber 50 which is connected to the precipitator 12 and disposed generally near and spaced a distance from the outlet opening 16. The insulator chamber 50 has an insulator opening 52 which extends a distance therethough intersecting one end thereof to provide a closed end 54 and an open end 56. The open end 56 is connected to the precipitator 12 so the flow opening 18 is in communication with the insulator opening 52 and the insulator chamber 50 extends a distance from the flow opening 18.

A portion of the insulator 48 extends through the closed end 54 of the insulator chamber 50 and is positioned so the electrical energy source 24 can be connected to the support 46 for connecting the electrical energy source 24 to the conductor 22 and electrode 20. A portion 58 of the insulator 48 is disposed in the insulator opening 52 and the portion 58 extends a distance through the insulator opening 52. However, the portion 58 of the insulator 48 is spaced a distance from the flow opening 18.

A pressurized air source 64 is adapted to provide clean, dry pressurized air. The pressurized air from the air source 64 is connected to the insulator chamber 50. More particularly, the pressurized air from the air source 64 is passed into the insulator chamber 50 by way of a conduit 65.

The pressurized air is at a pressure level which is higher than the pressure of the substantially soot free exhaust gas passing through the flow opening 18 and into the insulator opening 52. Thus, pressurized air within the insulator chamber 50 cooperates substantially to reduce the possibility of water or soot or conductive particles which might be present in the gas stream flowing pass the insulator opening 52 from entering and contaminating the insulator 48. In addition, the temperature level of the pressurized air provided by the air source 64 preferably is sufficiently high to maintain the temperature level of the insulator 48 portion 58 above the dew point of the gas in the insulator chamber 50 to reduce the possibility of water condensing on the insulator 48 portion 58.

A model precipitator was constructed substantially like the precipitator shown in FIG. 1. To test this model precipitator, a 6.2 liter, 378 cubic inches, indirect injection, Chevrolet engine operating at 1800 rpm with no load was used to produce the diesel engine exhaust gas stream. The fuel for operating this diesel engine was No. 2 diesel fuel having a composition as shown in Table I below.

TABLE I

| | |
|---|---|
| Sulfur | 0.22% |
| Paraffin | 83.0% |
| Olefin | 0.0% |
| Aromatics | 100.0% |

The exhaust gas stream was contacted in a contact zone with recirculating water by means of a full cone spray nozzle to produce the water saturated exhaust gas stream. The water flow rate was one (1) gpm, 3.9 liters per minute. The exhaust gas stream was cooled from 285° F., 140° C., to 115° F., 46° C., when contacted in this fashion. The water droplets were coalesced on conventional wire packing in the contact zone and recirculated.

A portion of the water saturated exhaust gas stream was passed into the model precipitator. The walls of the model precipitator were cooled with cooling water entering the cooling jacket 26 at 80° F., 27° C., and the cooling water was discharged from the cooling jacket 30 and discarded.

The electrode 20 was maintained at a potential just below where sparking would occur. With a vessel 12 inside diameter of about 2.3 inches, 5.8 centimeters, and a one-fourth (¼) inch, 6.4 millimeters, diameter electrode 20, sparking would occur at above 15 KV.

This test system was operated continuously for an eight (8) hour day. During two (2) hour intervals both the inlet exhaust gas stream and the outlet substantially soot free exhaust gas stream were sampled. Two separate vacuum pumps were utilized, one for the exhaust gas stream and the other for the substantially soot free exhaust gas stream. Each pump pulled gas at a rate of about 0.4 SCFM, 0.01 S Cu. meter, through Teflon coated pyrex glass filters which where mounted in heated and temperature controlled filter holders. Each filtered gas stream was cooled to about 35° F., 1.7° C., to remove water and then was passed through an oil sealed vacuum pump and through a positive displacement gas meter readable to 0.01 cubic foot, $2.8 \times 10^{-4}$ cu. meters.

The conductor 22 was fitted with a 1¾ inch long, 44 millimeters, flattened wire which served as the electrode 20 for producing the ionizing zone 26. Corona currents from the electrode 20 varied with the applied voltage in the manner indicated in Table II below.

TABLE II

Corona Current
5, 0.13 mm. × 20, 0.5 mm., mil wire 3¾", 44 mm. long in air

| KV | Positive Polarity Current ua |
|---|---|
| 10 | 9 |
| 11 | 10 |
| 12 | 17 |
| 13 | 25 |
| 14 | 30 |
| 15 | 40 |

The corona current did not change when the 115° F., 46° C., exhaust gas stream was introduced into the flow opening 18.

The substantially soot free exhaust gas stream was metered through an orifice.

Tests were made wherein the flow rate through the precipitator 12 was varied. Inlet exhaust gas samples and outlet substantially soot free exhaust gas samples were taken over two hour intervals. The results of these tests are summarized in Table III below.

TABLE III

| Run | Substantially Soot-Free Exhaust Gas Flow (SCFM) | Soot Removal, % | Avg. % | Polarity of Electrode 20 | Standard Cubic Meters Per Minute |
|---|---|---|---|---|---|
| 143 | 7.7 | 82 | 84 | + | 0.22 |
| 144 | 7.7 | 86 | | + | 0.22 |
| 145 | 11.0 | 72 | 72.2 | + | 0.31 |
| 146 | 11.8 | 72.4 | | + | 0.33 |
| 147 | 16.9 | 48 | 52 | + | 0.48 |
| 148 | 16.9 | 56 | | + | 0.48 |
| 149 | 7.5 | 76 | 81 | − | 0.21 |
| 150 | 7.3 | 87 | | − | 0.21 |
| 151 | 7.3 | 81 | | − | 0.21 |
| 159 | 16 | 4 | −7 | None | 0.45 |
| 160 | 16 | −10 | | None | 0.45 |
| 167 | 5.6 | 89 | | + | 0.16 |

In runs 159 and 160 in Table III above, all operating conditions were maintained the same as in the prior runs, except no high voltage was applied. In other words, no ionizing zone and no electric field was created. The average of runs 159 and 160 indicated an increase in soot concentration of seven (7) percent. This, of course, is physically impossible. However, these runs do indicate that negligible soot removal is accomplished without the ionizing zone and the electric field.

The overall pressure drop across the apparatus including the coalescing packing and the precipitator was six (6) inches water column.

Figure 2:
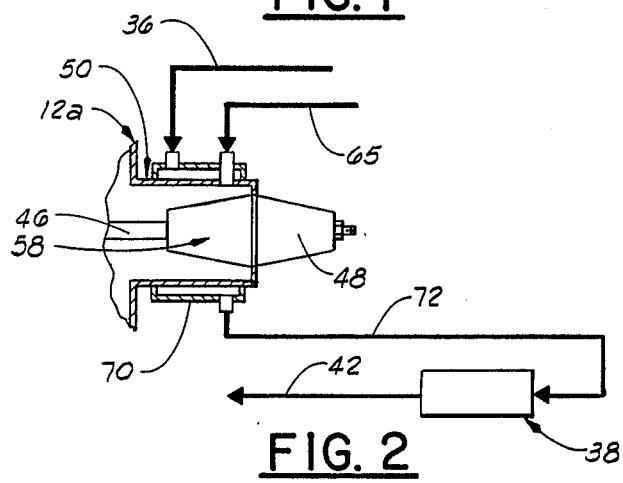
FIG. 2 is a sectional view of a portion of the precipitator of FIG. 1 showing the insulator and one means for maintaining the temperature level of the insulator above the dew point of the surrounding gases.

Embodiment of FIG. 2

Shown in FIG. 2 is a modified precipitator 12a which is constructed exactly like the precipitator 12 shown in FIG. 1 and described in detail before, except the precipitator 12a includes a hollow heating jacket 70 which is connected to the insulator chamber 50 and generally surrounds a portion of the insulator chamber 50 generally near the closed end 54 (see FIG. 1) thereof.

In the embodiment of the invention shown in FIG. 2, the exhaust gas stream or a portion thereof from the diesel engine 34 first is passed into the hollow portion of the heating jacket 70 by way of the conduit 36, and generally about the portion of the insulator chamber 50 surrounding the protected space 62. The hot exhaust gas stream thus provides a means for heating the portion 58 of the insulator 48 which is disposed in the insulator chamber 50. The portion 58 of the insulator 48 is heated by the hot exhaust gas stream to a temperature level above the dew point of the substantially soot free exhaust gas in the insulator opening 52 to prevent water from condensing on the portion 58 of the insulator 48. Thus, in this embodiment of the invention, it is not necessary to heat the pressurized air provided by the air source 64, since the heat in the exhaust gas stream is utilized to the insulator 48.

The exhaust gas stream or a portion thereof is passed from the heating jacket 70 through a conduit 72 and into the contact zone 38. The exhaust gas stream then is passed through the contact zone 38 and through the ionizing and cooled collection zones 26 and 28 in a manner and for reasons exactly like described before with respect to the system 10 shown in FIG. 1.

Figure 3:
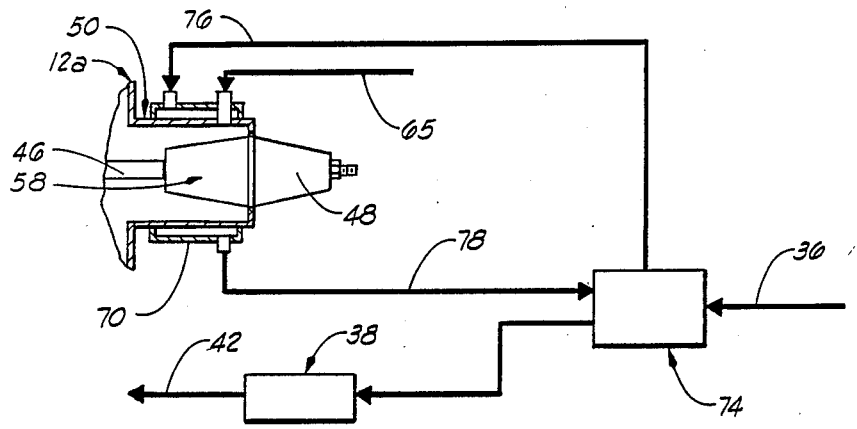
FIG. 3 is a view similar to FIG. 2, but showing an alternate means for maintaining a temperature level of the insulator above the dew point of the surrounding gases.

Embodiment of FIG. 3

Shown in FIG. 3 is a system for heating the portion 58 of the insulator 48 of the precipitator 12a, similar to the system shown in FIG. 2. In this embodiment, the exhaust gas stream is passed through a heat exchanger 74, prior to the exhaust gas stream being passed into the contact zone 38. A fluid (air or water or some other fluid) also is passed into the heat exchanger 74 by way of a conduit 78, and this fluid is heated in the heat exchanger 72 by the hot exhaust gas stream. The heated fluid is passed from the heat exchanger 74 through a conduit 76 and into the hollow portion of the heating jacket 70 surrounding a portion of the insulator chamber 50. The heated fluid passing through the hollow portion of the heating jacket 70 cooperates to heat the portion 58 of the insulator 48 in a manner and for reasons exactly like that described before with respect to FIG. 2, wherein the exhaust gas stream was passed directly into the heating jacket 70. The fluid returns to the heat exchanger 74 via a conduit 78. It should be noted that the fluid passing through the conduit 76 technically may be a vapor in some instances.

Figure 4:
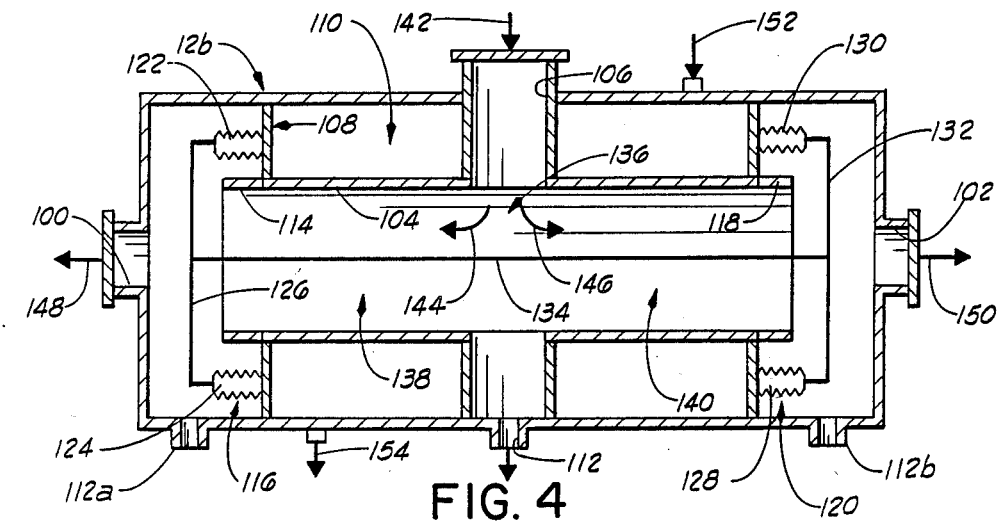
FIG. 4 is sectional view of a modified precipitator constructed in accordance with the present invention.

Embodiment of FIG. 4

Shown in FIG. 4 is a modified precipitator 12b The precipitator 12b comprises a generally cylindrically shaped vessel. A first outlet opening 100 is formed through one end of the precipitator 12b and a second outlet opening 102 is formed through the opposite end of the precipitator 12b. A flow opening 104 extends through a portion of the precipitator 12b generally between the opposite ends thereof. The flow opening 104 is in fluidic communication with the first and the second outlet openings 100 and 102. An inlet opening 106 is formed through a portion of the precipitator 12b generally midway between the first and the second outlet openings 100 and 102. The inlet opening 106 also is in fluidic communication with the flow opening 104.

A cooling jacket 108 is disposed in the precipitator 12b and the cooling jacket 108 extends a distance generally between the first and the second outlet openings 100 and 102. The cooling jacket 108 is hollow thereby providing a space 110 generally surrounding a portion of the precipitator 12b. The inner peripheral surface of the cooling jacket 108 forms the inner peripheral surface of a substantial portion of the precipitator 12b and the wall provided by the inner peripheral surface of the cooling jacket surrounds the flow opening 104. The inlet opening 106 also extends through a portion of the cooling jacket 108.

A condensate opening 112 is formed through the precipitator 12b. The condensate opening 112 extends through a portion of the cooling jacket 108 so that fluidic communication is established between the condensate opening 112 and the flow opening 104. The condensate opening 112 is spaced generally mid-way between the first and the second outlet openings 100 and 102. Additional condensate openings 112a and 112b are formed near the outlet openings 100 and 102.

A cylindrically shaped first baffle 114 is connected to one end of the cooling jacket 108 and the first baffle 114 extends a distance from one end of the cooling jacket 108. The first baffle 114 cooperates with a portion of the cooling jacket 108 to surround and partially encompass an insulator chamber 116. The baffle 114 is disposed and positioned so that the insulator chamber 116 is disposed generally near the first outlet opening 100.

A second baffle 118 is connected to the opposite end of the cooling jacket 108 and the second baffle 118 extends a distance from the cooling jacket 108. The second baffle 118 cooperates with a portion of the cooling jacket 108 to surround and partially encompass an insulator chamber 120. The insulator chamber 120 is disposed generally near the second outlet opening 102.

A pair of insulators 122 and 124 are disposed in the insulator chamber 116, and the insulators 122 and 124 are spaced approximately one hundred-eighty degrees apart. One end of a first conductive support 126 is connected to the insulator 122 and the opposite end of the first conductive support 126 is connected to the insulator 124. The first conductive support 126 thus extends between the insulators 122 and 124 and the first conductive support 126 extends generally across a portion of the flow opening 104, generally near the first outlet opening 100. Portions of the first conductive support 126 extend through the insulators 122 and 124 and are adapted to be connected to an electrical energy source, such as the electrical energy source 24 shown in FIG. 1.

A pair of insulators 128 and 130 are disposed in the insulator chamber 120 and the insulators 128 and 130 are disposed about one hundred-eighty degrees apart. One end of a second conductive support 132 is connected to the insulator 128 and the opposite end of the second conductive support 132 is connected to the insulator 130. Thus, the second conductive support 132 extends generally between the insulators 128 and 130 and a portion of the second conductive support 132 extends generally across a portion of the flow opening 104. The second conductive support 132 and the insulators 128 and 130 are each disposed generally near the second outlet opening 102.

One end of a conductive wire 134 is connected to a first conductive support 126 and the opposite end of the conductive wire 134 is connected to the second conductive support 132. The conductive wire 134 extends a distance through the flow opening 104 generally between the first and the second outlet openings 100 and 102 with a mid-portion of the conductive wire 134 being disposed generally near the inlet opening 106. The conductive wire 134 is a relatively thin electrically conductive wire which is capable of creating the ionizing zone within the precipitator 12b and capable of cooperating to create an electric field within portions of the precipitator 12b for forming the cooled collection zones. For example, the conductive wire 134 may have a diameter of about 0.003 inches, 0.076 mm.

When connected to the electrical energy source, the electrically conductive wire 134 produces an ionizing zone 136 within the flow opening 104 generally near the inlet opening 106. Further, when connected to the electrical energy source, the conductive wire 134 cooperates to produce an electric field generally between the conductive wire 134 and portions of the inner peripheral surface of the precipitator 12b or, more particularly, the inner peripheral surface of the cooling jacket 108 with the inner peripheral surface of the cooling jacket 108 operating as one electrode and the conductive wire 134 operating as the other electrode to create this electric field.

The electric field created by the conductive wire 134 forms a first cooled collection zone 138 in the precipitator 12b with the first cooled collection zone 138 extending generally between the inlet opening 106 and the first outlet opening 100. Further, the conductive wire 134 cooperates to produce a second cooled collection zone 140 in the flow opening 104 with the second cooled collection zone 140 extending generally between the inlet opening 106 and the second outlet opening 102.

In operation, the water saturated gas stream enters through the inlet opening 106 (indicated by the arrow 142 in FIG. 4). The water saturated stream passes first into the ionizing zone 136 formed in the flow opening 104. As the water saturated gas stream passes through the ionizing zone 136, particles and droplets in the water saturated gas stream are electrically charged to produce the gas stream containing electrically charged particles and droplets.

A portion of the gas stream containing electrically charged particles and droplets flows in a general direction 144 through a portion of the flow opening 104 generally from the inlet opening 106 toward the first outlet opening 100. Another portion of the gas stream containing electrically charged particles and droplets flows in a general direction 146 through the flow opening 104 in a general direction from the inlet opening 106 toward the second outlet opening 102. The portion of the gas stream containing electrically charged particles and droplets passing the in direction 144 passes through the first cooled collection zone 138 wherein soot and soot containing water droplets are electrostatically attracted and de-entrained to produce a first substantially soot free gas stream. The portion of the gas stream containing electrically charged particles and droplets passing in the other direction 146 pass through the second cooled collection zone 140 wherein the soot and soot containing water droplets are electrostatically attracted and de-entrained to produce a second substantially soot free gas stream.

The first substantially soot free gas stream is passed from the precipitator 12b through the first outlet opening 100, as indicated by the arrow 148 in FIG. 4. The second substantially soot free gas stream is passed from the precipitator 12b through the second outlet opening 102, as indicated by the arrow 150 in FIG. 4.

During the operation of the precipitator 12b, cooling water is passed into and through the space 110 in the cooling jacket 108, as indicated by an arrow 152 in FIG. 4. The cooling water is discharged from the space 110, as indicated by the arrow 154 in FIG. 4. The cooling water has a temperature level determined so that the walls formed in the flow opening 104 by the inner peripheral surface of the cooling jacket 108 are maintained at a temperature level below the dew point of the gas passing through the first and second cooled collection zones 138 and 140 for cooperating to form the first and the second cooled collection zone 138 and 140, in a manner and for reasons exactly like that described before with respect to the cooling jacket 30 and the cooled collection zone 28 formed in the precipitator 12 shown in FIG. 1.

The embodiment of the invention shown in FIG. 4 provides a means for supporting the relatively thin conductive wire 134 within the flow opening 104 wherein the opposite ends of the conductive wire 134 are securely supported by the first and second conductive supports 126 and 132 to create the ionizing zone 136 and the cooled collection zones 138 and 140. In addition, this embodiment of the invention provides a means for supporting the insulators 122, 124, 128 and 130 within insulators chambers 116 and 120, thereby locating the insulators 122, 124, 128 and 130 in low dew point, relatively clean or soot free locations within the precipitator 12b.

Although not shown in FIG. 4, the precipitator 12c also includes means for passing clean pressurized air into the insulator chambers 116 and 120 for reasons and in a manner described before with respect to the precipitators 12 and 12a. Also, the precipitator 12c includes a means for heating the insulator chambers 116 and 120 for reasons and in a manner described before with respect to the precipitator 12a.

Figure 5:
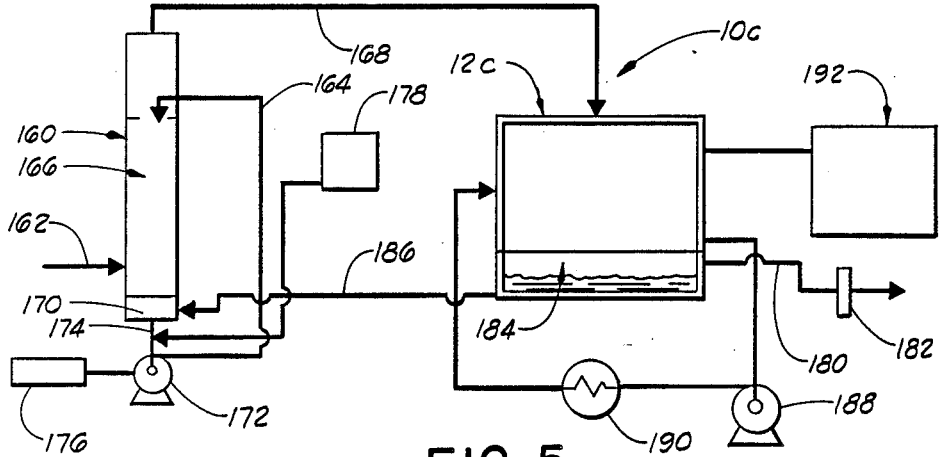
FIG. 5 is a diagrammatic, schematic view illustrating one embodiment of the system of the present invention.

Embodiment of FIG. 5

Schematically shown in FIG. 5 is another embodiment of a system 10c for removing soot from a diesel engine exhaust gas stream. In this embodiment, the diesel engine exhaust gas stream is passed into a lower end portion of a contactor vessel 160 as indicated by an arrow 162. Water is passed into an upper end portion of the contactor vessel 160 by way of a conduit 164. The contactor vessel 160 is constructed and adapted to provide a contact zone 166 within the contactor vessel 160.

The exhaust gas stream flows generally upwardly through the contactor vessel 160 and is contacted with water entering the contact zone 166 from the conduit 164 for producing the water-saturated gas stream which is passed from the contactor vessel 160 by way of a conduit 168. The contact zone 166 may be created in the contactor vessel 160 either by spraying water directly onto the exhaust gas stream with water sprays or the contactor vessel 160 may comprise a packed bed contactor wherein the water is passed through the packed bed formed within the contact zone 166 in one direction and the exhaust stream gas is passed through the packed bed in an opposite direction. In any event, the contact zone 166 is constructed and adapted to contact the exhaust gas stream passing through the contact zone 166 with water to produce the substantially water saturated gas stream.

An excess amount of water preferably is passed through the conduit 164 into the contact zone 166. Thus, excess water is collected in a fluid reservoir 170 formed in a lower end portion of the contactor vessel 160. A pump 172 is connected to the fluid reservoir 170 for pumping water from fluid reservoir 170 through a conduit 174 and recirculating the water through the contact zone 166. As shown in FIG. 5, the pump 172 preferably is driven by a hydraulic drive 176, at least in the embodiment of the present invention wherein the system is utilized to remove soot from a mobile diesel engine exhaust stream.

The excess water collected in the fluid reservoir 170 will not be sufficient to provide all of the water required to be passed through the contact zone 166. Thus, a make-up water supply 178 is connected to the pump 172 inlet for supplying the additional amounts of required water.

The water saturated gas stream is passed into a precipitator 12c. The precipitator 12c could be constructed like the precipitator 12 shown in FIG. 1. However, the precipitator 12c shown in FIGS. 6, 7 and 8 to be described in greater detail below.

In any event, the precipitator 12c is constructed to provide the ionizing zone and the cooled collection zone for the reasons mentioned before with respect to the ionizing zone 26 and the condensation zone 28 of the precipitator 12 shown in FIG. 1, for example. The precipitator 12c thus charges particles and droplets in the water saturated gas stream received from the conduit 168 and produces an electric field for electrostatically attracting and de-entraining soot and soot containing water droplets from the gas stream to produce a substantially soot free exhaust gas stream, in a manner like that described before with respect to the precipitator 12 shown in FIG. 1.

The substantially soot free exhaust gas stream is passed from the precipitator 12c through a conduit 180 and through a flame arrester 182. The flame arrestor 182 particularly is important when the system of the present invention is used to clean diesel engine exhaust streams in underground mine machines to avoid the possibility of igniting combustible gas mixtures external to the precipitator 12c. Flame arrestors are well known in the art and a detailed description of a flame arrester is not deemed necessary herein.

A condensate reservoir 184 is connected to the bottom of the precipitator 12c for collecting the water condensate passing from the condensation zone in the precipitator 12c. The condensate collected in the condensate reservoir 184 is passed into the fluid reservoir 170 through a conduit 186. Thus, in this embodiment, the condensate from the precipitator 12c is utilized as part of the water recirculated through the contact zone 166. This aspect of the invention particularly is important when the system is utilized for removing soot from mobile diesel engine exhaust streams in underground mine machines wherein such machines may have access to only a limited amount of water while being used in the underground mine application.

A cooling water for cooling the precipitator 12c walls and cooperating to produce the condensation zone in the precipitator 12c is circulated by a pump 188. The water, after being utilized to cool the walls, is recirculated through a heat exchanger 190 for lowering the cooling water temperature. This cooling water functions in the same manner and for the same reasons as described before with respect to the cooling water passing through the cooling jacket 30 of the precipitator 12 in FIG. 1.

An electrical energy source 192 is connected to the conductor and electrode or the conductive wire creating the ionization and cooled collection zones in the precipitator 12c. In the one application of the present invention, the system 10c is utilized to remove soot from a mobile diesel engine exhaust stream in an underground mine machine application as mentioned before. Such underground mine machines generally have a compressed air source or a hydraulic source available on the machine and either of these sources can be utilized to drive a turbine or hydraulic motor which in turn is utilized to drive an alternator. The alternator then provides the electrical energy to the precipitator 12c. In an alternate embodiment, the electrical energy source can be provided from 12-volt direct current available from an existing alternator present on some underground mine machines.

As mentioned before, the embodiment of the invention shown in FIG. 5 particularly is adapted to be utilized to remove soot from mobile diesel engine exhaust gas streams in underground mine applications. Such machines have a limited space available to accommodate the system of the present invention and such machines generally have limited sources of available power for use in connection with the system of the present invention. Thus, the pumps 172 and 188 can be driven by hydraulic drives which source of hydraulic power is available on such machines. In the alternative, these pumps 172 and 188 can be driven by a belt off the diesel engine belt drive. Space to store the make-up water 178 also is limited, so the system 10c is adapted to utilize the precipitator 12c condensate as a portion of the water for the contact zone 166 to conserve water usage during the operation of the system 10c. It is contemplated that the water stored for use in the contact zone 166 would be removed and replaced with fresh water on a periodic basis.

To provide an adequate ionization and cooled collection zones in the precipitator 12c to accommodate the volume of exhaust gas stream flow from typical diesel engines on underground mine machines, it is contemplated that the precipitator 12c actually would include a plurality of ionizing and cooled collection zones with each such ionizing and cooled collection zones being constructed like the precipitators 12, 12a and 12b shown in FIGS. 1, 2, 3 or 4. In one preferred embodiment, the precipitator 12c includes twenty (20) such ionizing and cooled collection zones and a preferred embodiment of such a precipitator 12c is shown in FIGS. 6, 7, 8 and 9, to be described in detail below.

In a typical mobile underground mine machine application with the precipitator 12c having twenty (20) ionizing zones and twenty (20) associated condensation zones, the exhaust gas stream typically flows at a rate of about 200 SCFM, 5.7 S. cu. meters per min., and enters the contact zone 166 at a temperature of about 800° F., 427° C. The water saturated exhaust gas stream leaves the contact zone at a temperature below 300° F., 149° C., and preferably at a temperature of about 150° F., 65.6° C. The pump 172 is sized to circulate water at a rate of about 2.0 gpm, 7.6 liters per minute, at 20 psig, 14,100 kilogram per square meter gage, and the capacity of the make-up water supply 178 is about 120 gallons, 455 liters. The pump 188 is sized to circulate cooling water at a rate of about 20 gpm, 76 liters per minute and the heat exchanger 190 is adapted to cool the water from about 140° F., 60° C., to about 120° F., 49° C. The electrical energy source 192 is adapted to supply a direct current 17,000 volts, 2 milliamps to the conductors and electrodes in the condensation and ionizing zones.

Embodiments of 6, 7, 8 and 9

Shown in FIGS. 6, 7, 8 and 9 is one preferred embodiment of the precipitator 12c shown in FIG. 5, which incorporates twenty (20) ionizing zones and twenty (20) cooperating cooled collection zones.

The precipitator 12c is enclosed in the generally rectangularly shaped housing 200 having an inlet opening 202 (FIGS. 7 and 9) formed through a portion thereof. An outlet opening 206 (FIGS. 6, 7 and 9) is formed through a portion of the housing 200 on the opposite side of the housing 200 with respect to the inlet opening 202.

Figure 6:
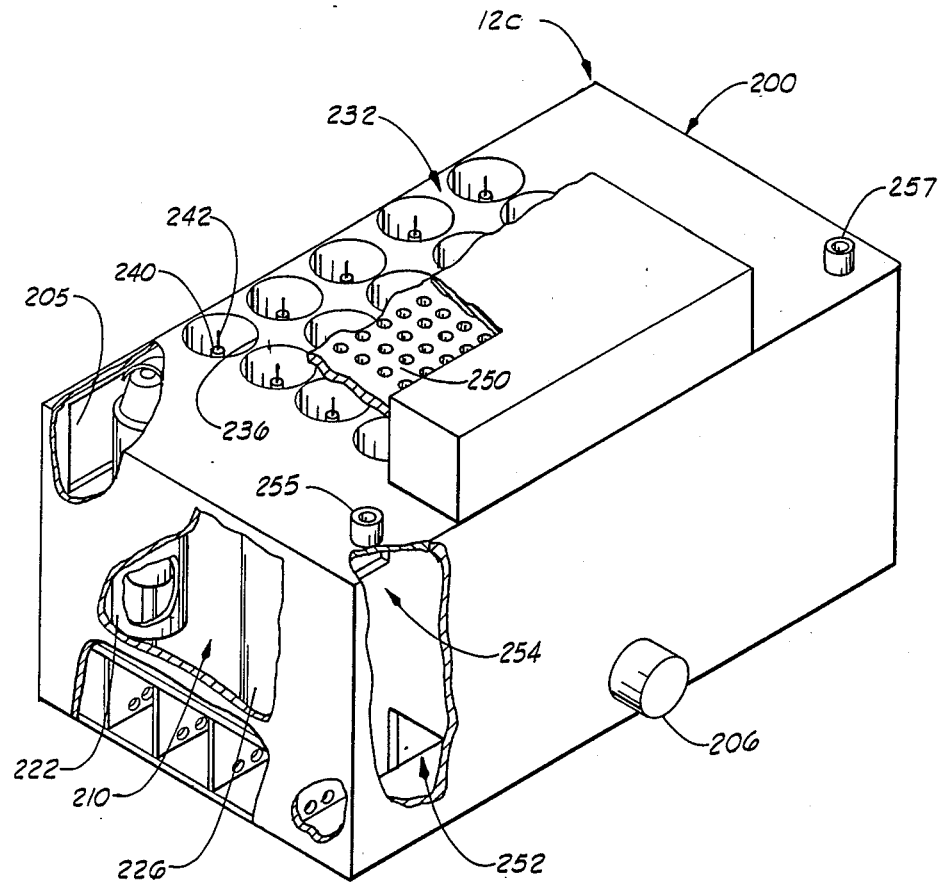
FIG. 6 is a diagrammatic perspective view of another modified precipitator which is constructed in accordance with the present invention and which includes a plurality of ionizing zones and a plurality of condensation zones.
Figure 7:
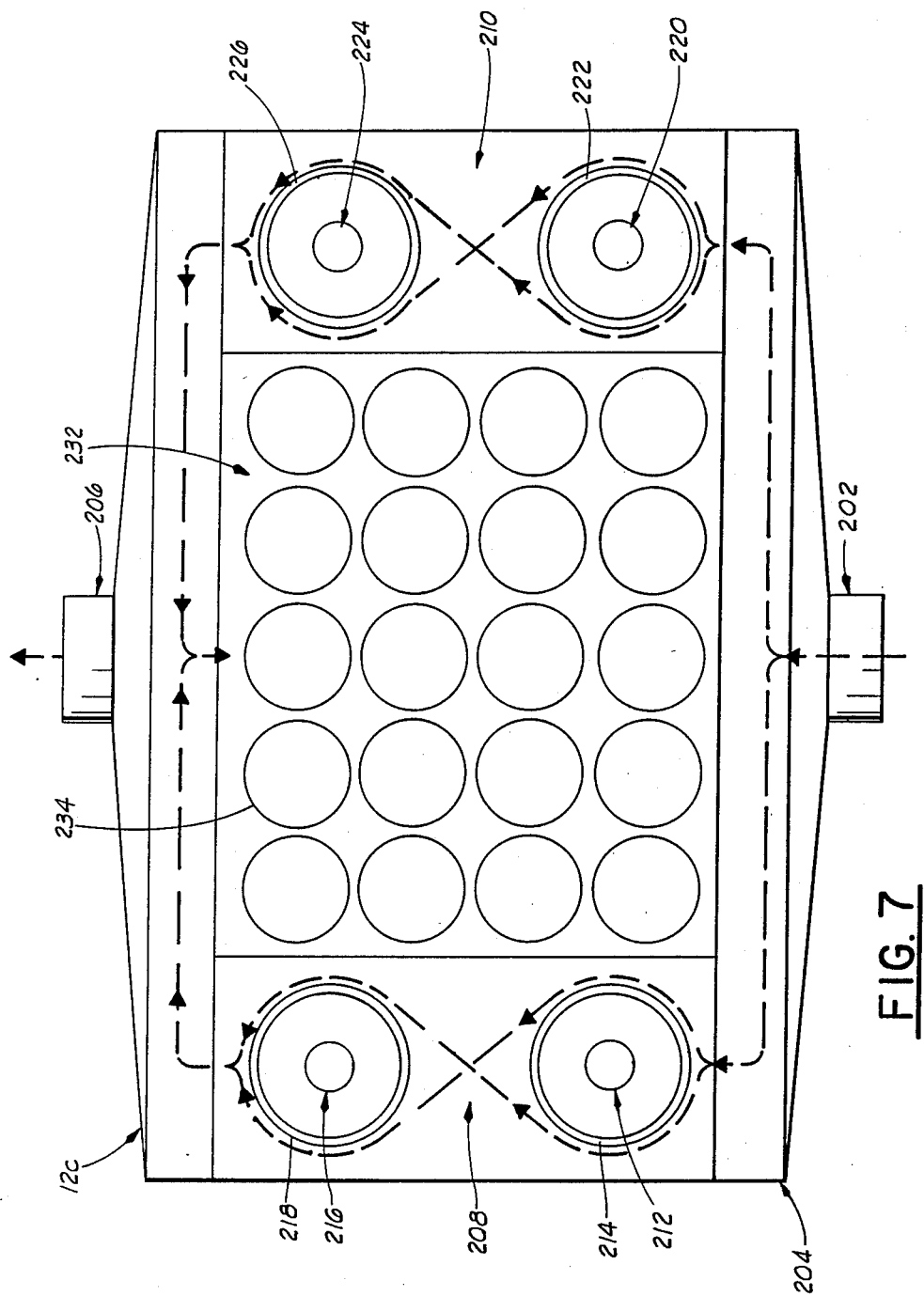
FIG. 7 is a schematic view of the precipitator of FIG. 6 illustrating a portion of the gas flow through the precipitator.
Figure 9:
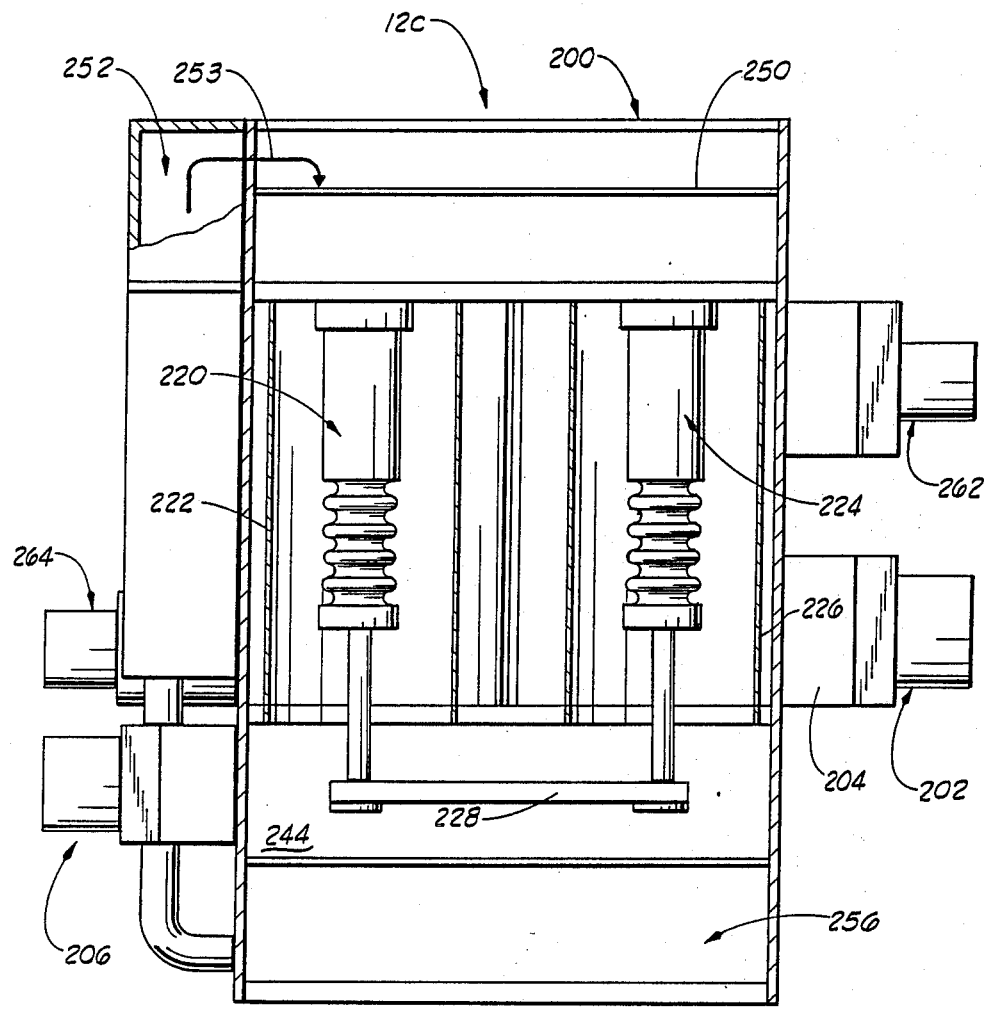
FIG. 9 is an end, partial elevational, partial sectional view of the precipitator of FIGS. 6 and 7.

In this embodiment, the hot exhaust gas stream passes into the inlet opening 202 and into a feed header 204 (FIGS. 7 and 9). The hot exhaust gas is divided in the header 204, and one portion (about one-half) of the exhaust gas stream is passed through an opening 205 (FIG. 6) and the balance is passed through a similar opening (not shown) at the opposite end of the housing 200. Thus, the exhaust gas stream enters the precipitator 12c by way of the inlet opening 202, ad the substantially soot free exhaust gas stream exits the precipitator 12c by way of the outlet opening 206 to be passed through the conduit 180 (FIG. 5).

A first insulator compartment 208 (FIGS. 7 and 8) is formed in the housing 200 and the first insulator compartment 208 includes walls in the housing 200 which cooperate to enclose the space defined by the first insulator compartment 208. The first insulator compartment 208 is disposed generally near one end of the housing 200. The inlet opening 202 is in communication with the first insulator compartment 208 and thus the portion of the exhaust gas stream entering the housing 200 by way of the inlet opening 202 is passed into the first insulator compartment 208.

A second insulator compartment 210 (FIGS. 6, 7 and 8) is formed in the housing 200 and the second insulator compartment 210 includes walls in the housing 200 which cooperate to enclose the space defined by the second insulator compartment 210. The second insulator compartment 210 is disposed generally near one end of the housing 200, and the second insulator compartment 210 is spaced a distance from the first insulator compartment 208. As shown in FIG. 6, the opening 205 intersects the second insulator compartment 210 and thus the portion of the exhaust gas stream entering the housing 200 by way of the inlet opening 202 is passed into the second insulator compartment 210.

A first insulator 212 (FIGS. 7 and 8) is supported in the first insulator compartment 208 by way of a support structure 214 (FIGS. 7 and 8) and a second insulator 216 (FIG. 7) is supported in the first insulator compartment 208 by way of a similar support structure 218 (FIG. 7). The support structure 214 substantially encloses the insulator 212 and the second insulator 216 is enclosed in a similar manner by the support structure 218, so the exhaust gas stream entering the first insulator compartment 208 does not contact the insulators 212 and 216.

Figure 8:
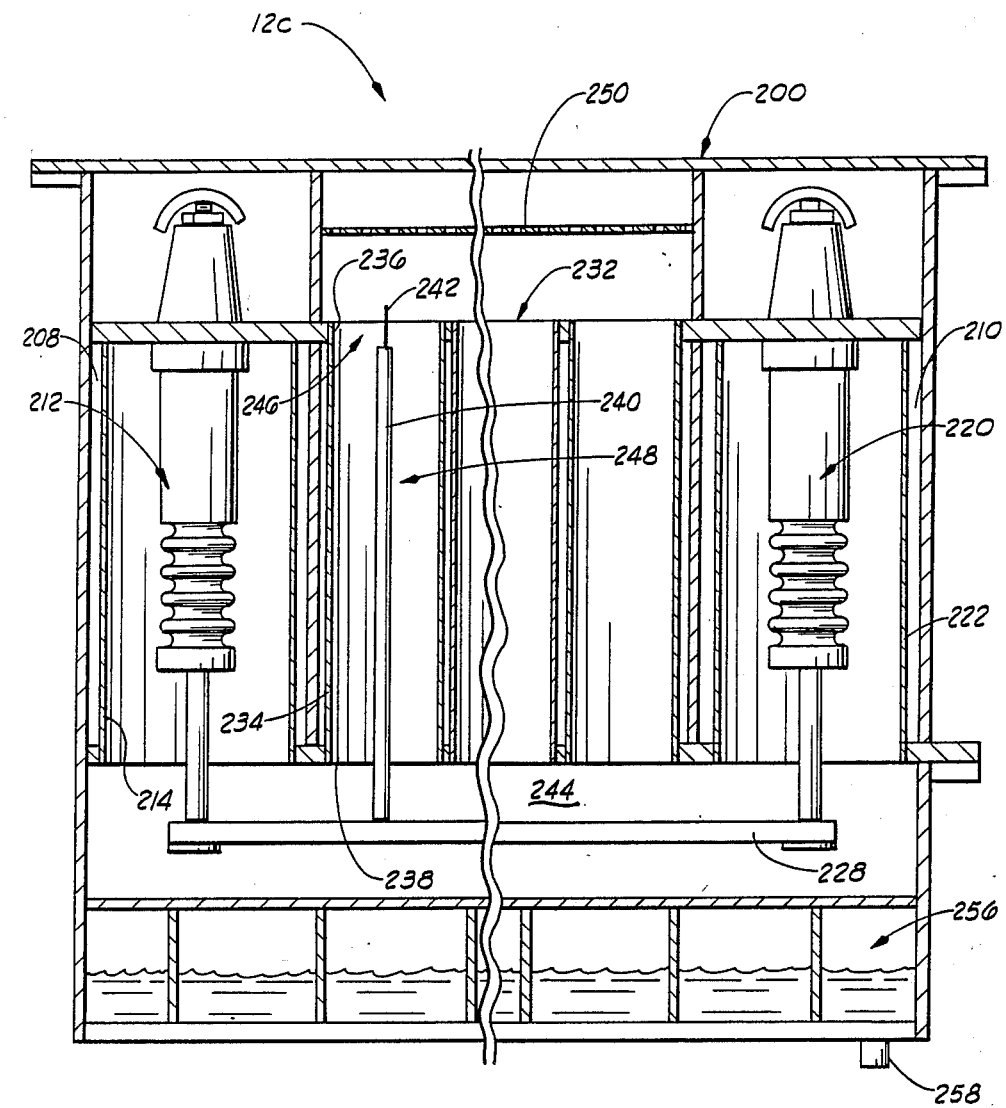
FIG. 8 is a side sectional view of the precipitator of FIG. 6.

A third insulator 220 (FIGS. 7, 8 and 9) is disposed in the second insulator compartment 210 and supported therein by a support structure 222 (FIGS. 6, 7, 8 and 9). A fourth insulator 224 (FIGS. 7 and 9) is disposed in the second insulator compartment 210 and supported therein by a support structure 226 (FIGS. 7, 8 and 9). The support structures 222 and 226 substantially enclose the respective insulators 220 and 224, so the exhaust gas stream entering the second insulator compartment 210 does not contact the insulators 220 and 224.

One end of an electrically conductive support 228 (FIGS. 8 and 9) extends through the first insulator 212 and is adapted to be connected to the electrical energy source 192 (FIG. 5). The conductive support 228 extends from the insulator 212 outwardly through an opening in the first insulator compartment 208 and the conductive support 228 includes a portion which extends to and through a portion of the third insulator 220. The opposite end portion of the conductive support 228 associated with the third insulator 220 also is adapted to be connected to the electrical energy source 192 (FIG. 5).

One end of the electrically conductive support 228 extends through the second insulator 216 and is adapted to be connected to the electrical energy source 192 (FIG. 5). The conductive support 228 extends from the second insulator 216 outwardly through an opening in the first insulator compartment 208 and the conductive support 228 includes a portion which extends to and through a portion of the fourth insulator 224. The opposite end portion of the conductive support 228 associated with the fourth insulator 224 also is adapted to be connected to the electrical energy source 192 (FIG. 5).

Thus, the conductive support 228 is supported in the housing 200 by the insulators 212, 216, 220 and 224.

A generally rectangularly shaped electrode support compartment 232 (FIG. 6, 7 and 8) is formed in the housing 200. The electrode support compartment 232 is disposed generally between the first and second insulator compartments 208 and 210. A plurality of cylindrically shaped tubes 234 (only one of the tubes 234 being designated by a reference numeral in the (FIGS. 7 and 8) are disposed and supported within the electrode support compartment 232.

Each of the tubes 234 has an inlet end 236 (FIGS. 6 and 8) and an outlet end 238 (only one of the ends 236 and 238 being designated in FIG. 8 by a reference numeral). Each of the tubes 234 has an opening which extends therethrough and intersects the opposite ends 236 and 238 thereof. More particularly, twenty (20) tubes 234 are supported in the electrode support compartment 232 and the tubes 234 are disposed in four banks of tubes with five tubes 234 being disposed in each bank of tubes. Each bank of tubes includes five generally aligned tubes 234 extending generally between the first and the second insulator compartments 208 and 210.

The precipitator 12c includes twenty (20) conductors 240 (only one of the conductors 240 being designated by a reference numeral in FIGS. 6 and 8) and twenty (20) electrodes 242 (only one of the electrodes 242 being designated by reference numeral in FIGS. 6 and 8). Each conductor 240 is disposed in one of the tubes 234 and each conductor 240 extends generally between the opposite ends 236 and 238 of one of the tubes 234. One end of each conductor 240 extends a distance from outlet end 238 of one of the tubes 234 through an opening formed in the electrode support compartment 232 and into a space 244 (FIGS. 8 and 9) disposed generally below the electrode support compartment 232. Each electrode 242 is connected to one end of one of the conductors 240 and each electrode 242 is disposed generally near the inlet end 236 of one of the tubes 234.

The conductive support 228 extends through the space 244 generally under the electrode support compartment 232. One end of each of the conductors 240 is connected to the conductive support 228.

The electrodes 242 cooperate with the tubes 234 to form a plurality (twenty in this embodiment) of ionizing zones 246 (only one of the ionizing zones 246 being designated by a reference numeral in FIG. 8). The conductors 240 cooperate with the tubes 234 to form a plurality (twenty in this embodiment) of cooled collection zones 248 (only one of the cooled collection zones 248 being designated by a reference numeral in FIG. 8). The walls of each tube 234 surrounding one of the conductors 240 is connected to the housing 200 and forms the other electrode for cooperating with one of the conductors 240 in producing the electric field in each of the cooled collection zones 248. Each electrode 242 cooperates with the walls of one of the tubes 234 to form one of the ionizing zones 246.

A distribution baffle 250 (FIGS. 6, 8 and 9) is supported in the housing 200 generally above the electrode support compartment 232 and generally above the inlet ends 236 of each of the tubes 234. The distribution baffle 250 has a plurality of openings formed therethrough, and the spaces in the housing 200 generally above and below the distribution baffle 250 are in communication with the openings in each of the tubes 234 disposed in the electrode support compartment 232.

A first gas passage 252 (FIGS. 6 and 8) is formed in the housing 200 and the first gas passage 252 extends generally from the first insulator compartment 208, through a portion of the housing 200, to a position generally above the distribution baffle 250. A second gas passage extends from the second insulator compartment 210 also to a position generally above the distribution baffle 250. A third gas passage is formed in the housing 200, and the third gas passage extends from the space 244 below the electrode support compartment 232, through a portion of the housing 200, to the outlet opening 206.

In operation, the hot exhaust gas stream enters the housing 200 by way of the inlet opening 202. The hot gas stream is divided in the header 204. One half of the hot exhaust gas stream passes through the opening 205 and the remaining hot exhaust gas stream passes through a similar opening at the opposite end of the housing 200. The hot exhaust gas stream passes through the first and the second insulator compartments 208 and 210 for heating the support structures 214, 218, 222 and 226, thereby heating the insulators 212, 216, 220 and 224 in the manner and for reasons described before.

The hot exhaust gas passes from the second insulator chamber 210 and through a contact zone 254 (FIG. 6) where the exhaust gas stream is contacted by water entering through a spray nozzle 255 (FIG. 6). The spray nozzle 255 is positioned so that water may inject into the hot exhaust gas stream to saturate it with water vapor, for reasons and in a manner described before with respect to the other contact zones. Excess water returns to a condensate chamber 256 formed in the bottom of the housing 200.

The hot exhaust gas also passes from the first insulator chamber 208 and through a similar contact zone (not shown) where the exhaust gas stream is contacted by water entering through a spray nozzle 257 (FIG. 6). The spray nozzle 257 is positioned so that water may be injected into the hot exhaust gas stream to saturate it with water for reasons and in a manner described before with respect to the other contact zones. Again, excess water returns to the condensate chamber 256.

From the contact zones, the water saturated gas stream flows upward and into the space generally above the distribution baffle 250, as indicated by the arrow 253 in FIG. 9. The water saturated gas stream then passes through the openings in the distribution baffle 250 and into the inlet ends 236 of each of the tubes 234. The distribution baffle 250 is disposed and arranged to distribute the water saturated gas stream so that approximate equal volumes of the water saturated gas stream flow through each of the tubes 234. The gas flow just described is schematically illustrated by dashed-line arrows in FIG. 7.

The water saturated gas stream then passes through the ionizing zones 246 and the cooled collection zones 248 and out the outlet ends 238 of each of the tubes 234. The substantially soot free exhaust gas passing from the outlet ends 238 of each of the tubes 234 passes through a gas passage and out the outlet opening 206. The ionizing zones 246 and the cooled collection zones 248 cooperate to produce the substantially soot free exhaust gas stream in a manner exactly like that described before with respect to the ionizing zone 26 and the condensation zone 28 in the precipitator 12 shown in FIG. 1.

Water condensed on the walls of each of the tubes 234 washes off the collected soot and drains by gravity through openings in the electrode support compartment 232 and into the condensate chamber 256 (FIGS. 8 and 9) formed in a lower portion of the housing 200. A condensate outlet 258 (FIG. 8) is formed through the housing 200 and the condensate outlet 258 is in fluidic communication with the condensate chamber 256. The water or condensate collected in the condensate chamber 258 forms the condensate reservoir 184 (FIG. 5), and the condensate preferably is recirculated as part of the water passed through the contact zone 166, for reasons and in a manner described before in connection with FIG. 5. As described before, the contact zones are formed in the housing 200, as opposed to external contact zone 166 shown in FIG. 5.

The walls in the housing 200 forming the electrode support compartment 232 cooperate with the tubes 234 to form a cooling jacket surrounding the ionizing zones 246 and cooled collection zones 248.

A cooling water inlet 262 (FIG. 9) is formed through a portion of the housing 200 and the cooling water inlet 262 is connected to the cooling jacket surrounding the tubes 234. Cooling water passes into the precipitator.12c by way of the cooling water inlet 262 and the cooling water is circulated through the cooling jacket for cooling the walls of the tubes 234, in a manner and for reasons described in detail before in connection with the cooling jacket 30 of the precipitator 12 shown in FIG. 1 and the cooling water circulated by the pump 188 (FIG. 5). The cooling water is discharged from the electrode support compartment 232 and passes through a cooling water outlet 264 (FIG. 9) formed in the housing 200. It should be understood that other cooling fluids including air can be used for the purpose of cooling the tubes 234.

Four purge air inlets (not shown) are formed through the housing 200. One of the purge air inlets is connected to the volume surrounding insulator 212 the other purge inlets are connected to the volume surrounding insulator 216, 220 and 224. The purge inlets each are connected to a pressurized air source such as the pressurized air source 64 (FIG. 1) for providing pressurized air generally within the enclosures surrounding the insulators for reasons and in a manner described before in connection with the pressurized air passed into the protected space 62 of the precipitator 12 shown in FIG. 1.

Changes may be made in the construction and the operation of the various elements and assemblies described herein and changes may be made in the steps or sequence of steps of the methods described herein without departing from the spirit and the scope of the invention as defined in the following claims.

What is claimed is:

1. An apparatus for removing soot from a diesel engine exhaust gas stream wherein portions of the apparatus are connectable to an electrical energy source for supplying electrical energy comprising:

means for contacting the exhaust gas stream with water to produce a substantially water saturated gas stream;

means for electrically charging particles and droplets in the water saturated gas stream; and means for electrostatically attracting and de-entraining soot and soot containing water droplets from the gas stream containing electrically charged particles and droplets to produce a substantially soot free exhaust gas stream; and wherein the means for charging particles and droplets and the means for electrostatically attracting and de-entraining soot and soot containing water droplets further comprise:

a precipitator having an inlet opening and an outlet opening and a flow opening extending through the precipitator intersecting the inlet and outlet openings, the water saturated gas stream being passable through the inlet opening and into and through the flow opening, the substantially soot free exhaust gas stream being passable through the outlet opening;

an electrode disposed in the flow opening generally near the inlet opening, the electrode being connectable to the electrical energy source and the electrode cooperating to produce an ionizing zone in the flow opening generally about the electrode when being supplied electrical energy from the electrical energy source, the particles and droplets in the water saturated exhaust gas stream passing through the ionizing zone and being electrically charged therein to produce the gas stream containing electrically charged particles and droplets; and a conductor disposed in the flow opening and extending a distance generally between the inlet and outlet openings, the conductor being disposed generally near the electrode in a direction generally toward the outlet opening and the conductor being connectable to the electrical energy source for cooperating to produce an electric field generally within the flow opening, said electric field cooperating to produce a collection zone in the flow opening for electrostatically attracting and de-entraining the soot and soot containing water droplets and particles;

an insulator connected to the conductor and to a portion of the precipitator for electrically insulating the conductor;

an insulator chamber having an insulator opening extending a distance therethrough and intersecting one end thereof to provide a closed end and an open end, the open end being in communication with the flow opening so the flow opening is in communication with the insulator opening and the insulator opening extending a distance from the flow opening, the insulator chamber being disposed near and spaced a distance from the outlet opening of the precipitator, a portion of the insulator being disposed in the insulator opening and the remaining portion of the insulator extending through the closed end of the insulator chamber so the insulator is spaced a distance from the flow opening to reduce contact of water or soot or conductive particles with the insulator.

2. The apparatus of claim 1 wherein the means for electrostatically attracting and de-entraining soot and soot containing water droplets is defined further to comprise:

means for establishing an electric field generally between two electrodes; and means for maintaining the surface temperature of at least one of the electrodes below the dew point of the gas stream containing electrically charged particles and droplets.

3. The apparatus of claim 1 wherein the electrode is connected to the conductor and wherein the electrode is connectable to the electrical energy source through the conductor.

4. The apparatus of claim 1 wherein the means for electrostatically attracting and de-entraining soot and soot containing water droplets is defined further to include:

Means for cooling portions of the precipitator generally surrounding the conductor for maintaining the temperature of the surface of the cooled portions of the precipitator below the dew point of the gas stream containing the electrically charged particles and droplets passing through the condensation zone, the cooled portions of the precipitator cooperating with the electrode to provide the collection zone.

5. The apparatus of claim 1 defined further to include:

means for providing pressurized air to the insulator opening in the insulator chamber for cooperating substantially to prevent water or soot or conductive particles from entering the protected space.

6. The apparatus of claim 1 defined further to include:

means for heating the insulator to a temperature level above the dew point of the substantially soot free exhaust gas for cooperating substantially to prevent the possibility of water from condensing on the insulator.

7. A method for removing soot from a diesel engine exhaust stream, comprising the steps of:

contacting the exhaust gas stream with water in a contact zone to produce a substantially water saturated exhaust gas stream;

electrically charging particles and droplets in the water saturated exhaust gas stream in an ionizing zone;

electrostatically attracting and de-entraining soot and soot containing water droplets from the gas stream containing electrically charged particles and droplets in a collection zone to produce a substantially soot free exhaust gas stream; wherein insulator means are operatively associated with the ionizing and collection zones, the method further comprising:

heating a fluid stream with the exhaust gas stream; and passing the heated fluid stream generally near the insulator means for maintaining the temperature of the insulator means above the dew point of the gas stream containing electrically charged particles and droplets.

8. The method of claim 7 wherein the step of electrostatically attracting and de-entraining soot and soot containing water droplets is defined further to include the steps of:

establishing an electric field between two electrodes;

maintaining the surface temperature of at least one of the electrodes below the dew point of the gas stream containing electrically charged particles and droplets.

9. In a diesel engine system for removing soot from the diesel engine exhaust gas stream; in an underground environment the improvement comprising:
   means for contacting the exhaust gas stream with water to produce a substantially water saturated gas stream;
   means for electrically charging particles and droplets in the water saturated gas stream; and
   means for electrostatically attracting and de-entraining soot and soot containing water droplets from the gas stream containing electrically charged particles and droplets to produced a substantially soot free exhaust gas stream.

10. The improvement of claim 9 wherein the means for electrostatically attracting and de-entraining soot and soot containing water droplets is defined further to comprise:
    means for establishing an electric field generally between two electrodes; and
    means for maintaining the surface temperature of at least one of the electrodes below the dew point of the gas stream containing electrically charged particles and droplets.

11. The improvement of claim 9 wherein portions of the apparatus are connectable to an electrical energy source for supplying electrical energy, and wherein the means for charging particles and droplets and the means for electrostatically attracting and de-entraining soot and soot containing water droplets are defined further to comprise:
    a precipitator having an inlet opening and an outlet opening and a flow opening extending through the precipitator intersecting the inlet and outlet openings, the water saturated gas stream being passable through the inlet opening and into and through the flow opening, the substantially soot free exhaust gas stream being passable through the outlet opening;
    an electrode disposed in the flow opening generally near the inlet opening, the electrode being connectable to the electrical energy source and the electrode cooperating to produce an ionizing zone in the flow opening generally about the electrode, when being supplied electrical energy from the electrical energy source, the particles and droplets in the water saturated exhaust gas stream passing through the ionizing zone and being electrically charged therein to produce the gas stream containing electrically charged particles and droplets; and
    a conductor disposed in the flow opening and extending a distance generally between the inlet and outlet openings, the conductor being disposed generally near the electrode in a direction generally toward the outlet opening and the conductor being connectable to the electrical energy source for cooperating to produce an electric field generally within the flow opening, said electric field cooperating to produce a collection zone in the flow opening for electrostatically attracting and de-entraining the soot and soot containing water droplets and particles.

12. The improvement of claim 11 wherein the electrode is connected to the conductor and wherein the electrode is connectable to the electrical energy source through the conductor.

13. The improvement of claim 11 wherein the means for electrostatically attracting and de-entraining soot and soot containing water droplets is defined further to includes:
    means for cooling portions of the precipitator generally surrounding the conductor for maintaining the temperature of the surface of the cooled portions of the precipitator below the dew point of the gas stream containing electrically charged particle and droplets passing through the condensation zone, the cooled portions of the precipitator cooperating with the electrode to provide the collection zone.

14. The apparatus of claim 11 wherein the precipitator is defined further to include:
    an insulator connected to the conductor and to a portion of the precipitator for electrically insulating the conductor.

15. The improvement of claim 14 wherein the precipitator is defined further to include:
    an insulator chamber having an insulator opening extending a distance therethrough and intersecting one end thereof to provide a closed end and an open end, the open end being in communication with the flow opening so the flow opening is in communication with the insulator opening and the insulator opening extending a distance from the flow opening, the insulator chamber being disposed near and spaced a distance from the outlet opening of the precipitator, a portion of the insulator being disposed in the insulator opening and the remaining portion of the insulator extending through the closed end of the insulator chamber so the insulator is spaced a distance from the flow opening to reduce contact of water or soot or conductive particles with the insulator.

16. The improvement of claim 15 defined further to include:
    means for providing pressurized air to the insulator opening in the insulator chamber for cooperating substantially to prevent water or soot or conductive particles from entering the protected space.

17. The improvement of claim 15 defined further to include:
    means for heating the insulator to a temperature level above the dew point of the substantially soot free exhaust gas for cooperating substantially to prevent water condensing on the insulator.

* * * * *